(12) United States Patent
Virving

(10) Patent No.: US 6,602,310 B1
(45) Date of Patent: Aug. 5, 2003

(54) SEPARATOR DEVICE WITH ROTOR HAVING PERIPHERAL CARRIERS FOR SEPARATING SOLID PARTICLES FROM A GAS STREAM

(75) Inventor: Nils Virving, Hässelby (SE)

(73) Assignee: Valmet Fibertech AB (SE)

( * ) Notice: Subject to any disclaimer, the term of this patent is extended or adjusted under 35 U.S.C. 154(b) by 0 days.

(21) Appl. No.: 09/979,536

(22) PCT Filed: May 11, 2000

(86) PCT No.: PCT/SE00/00945

§ 371 (c)(1),
(2), (4) Date: Nov. 6, 2001

(87) PCT Pub. No.: WO00/69543

PCT Pub. Date: Nov. 23, 2000

(30) Foreign Application Priority Data

May 12, 1999 (SE) .................................. 9901752

(51) Int. Cl.[7] .............................................. B01D 33/00
(52) U.S. Cl. .............................. 55/404; 55/408; 55/430
(58) Field of Search ........................ 55/404, 405, 406, 55/408, 438, 466, 430

(56) References Cited

U.S. PATENT DOCUMENTS

| | | | | |
|---|---|---|---|---|
| 3,274,757 A | * | 9/1966 | Wapler | 96/359 |
| 4,156,600 A | * | 5/1979 | Jacobson | 55/285 |
| 4,725,295 A | | 2/1988 | Fisher | |

FOREIGN PATENT DOCUMENTS

| | | |
|---|---|---|
| DE | 226392 | 10/1910 |
| SE | 510 247 | 5/1991 |
| SE | 510 247 C2 | 5/1991 |

* cited by examiner

Primary Examiner—Robert A. Hopkins
(74) Attorney, Agent, or Firm—Lerner, David, Littenberg, Krumholz & Mentlik, LLP

(57) ABSTRACT

Apparatus for continuously separating a stream of solid particles and a gas is provided including a housing with a tangential inlet for the stream of solid particles in a gas, a first outlet for the solid particles and a second outlet for the gas, a rotor rotatably mounted within the housing and including a plurality of carriers thereabout, the tangential inlet and the first outlet being disposed on the periphery of the housing spaced from each other in the circumferential direction, and an airtight discharge conduit associated with the first outlet, and second outlet being located centrally in the housing.

3 Claims, 1 Drawing Sheet

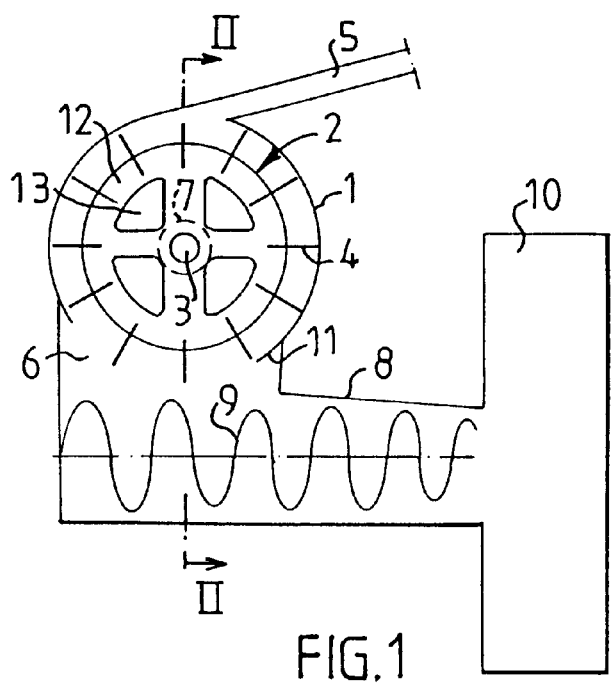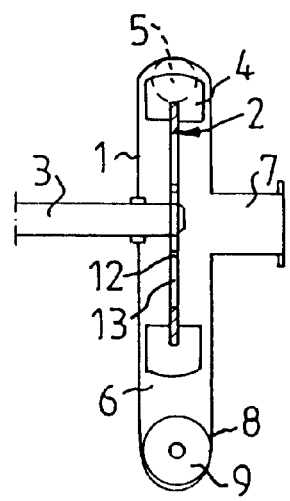
FIG.1
FIG.2

SEPARATOR DEVICE WITH ROTOR HAVING PERIPHERAL CARRIERS FOR SEPARATING SOLID PARTICLES FROM A GAS STREAM

FIELD OF THE INVENTION

The present invention relates to apparatus for the continuous separation of solid particles and gas, for example a mixture of fibrous material and steam. More particularly, the present invention relates to such apparatus comprising a housing with a substantially circular cross-section, a rotary rotor provided with carriers in the housing, a tangential inlet connected to the housing for a mixture of particle material and gas, and separate outlets for particles and gas, respectively.

BACKGROUND OF THE INVENTION

During the manufacture of mechanized pulp from fibrous material in a refiner, large amounts of steam are simultaneously formed, as the fibrous material is defibered and refined to pulp. From the refiner a mixture of fibrous material and steam is transported to a device for separating the steam from the fibrous material. The steam is recovered for use in other locations in the process, and the fibrous material is advanced to subsequent process steps. The steam separation normally takes place in a cyclone, where the fibrous material/steam is supplied tangentially to a cylindrical container. The fibrous material, due to the effect of centrifugal force moves along the container wall downwardly, and is fed out through a conical tapering portion at the same time as the steam is discharged upwardly in the container. Such a cyclone can function well when the material is dry, but due to the fact that the fibrous material is often moist and includes sticky extractive matter, such as resins and the like, problems arise with non-uniform discharge and clogging of the cyclone. These problems can be overcome to some extent by placing a rotary helical transport means adjacent the cyclone wall in order to feed the material downwardly to the outlet during rotation. Such a transport means, however, disturbs the cyclone effect, and it has often even been found that the transport means is insufficient, and therefore does not entirely prevent the formation of fibrous deposits in the cyclone. The cyclone, instead, is overdimensioned in order to operate satisfactorily in spite of these fibrous deposits. This implies, however, increased costs for the equipment. Another problem with this type of cyclone is that it has a relatively poor separation effect during steam separation according to the above discussion.

One object of the present invention is to provide a separation device which eliminates the aforesaid problems. Such a device would thus avoid such fibrous deposits, and the separation effect can be improved without having to overdimension the device. The dimensions of such a device, instead, can be reduced in relation to a conventional cyclone with the same capacity. Such a device, futhermore, can be used for particulate material with a dry matter content down to about 20%.

SUMMARY OF THE INVENTION

These and other objects have now been realized by the discovery of apparatus for continuously separating a stream of solid particles in a gas comprising a housing having a substantially circular cross-sectional shape, and including a tangential inlet for the stream of solid particles in a gas, a first outlet for the solid particles and a second outlet for the gas, a rotor rotatably mounted within the housing for rotation therein, the rotor including a plurality of carriers thereabout, the tangential inlet and the first outlet being disposed on the periphery of the housing spaced from each other in the circumferential direction, and airtight discharge means associated with the first outlet, the second outlet being located centrally in the housing. In a preferred embodiment, the rotor comprises a circular disk, the plurality of carriers being disposed on the periphery of the circular disk. Preferably, the circular disk includes a plurality of openings disposed radially within the plurality of carriers.

The apparatus according to the present invention is designed for tangential supply of particulate material/gas to the periphery of the housing where the rotor provided with carriers rotates in the same direction as the supply of particulate material/gas. The rotational speed is higher, and preferably 10% to 20% higher, than the supply speed for the stream of particulate material/gas. Separate outlets for the particulate material and gas, respectively, are provided in the housing. The particle outlet is located at the periphery of the housing spaced from the inlet, while the gas outlet is located centrally. In this manner, the particulate material, by the influence of centrifugal force, will be moved to and out through the particle outlet, and at the same time the gas will flow out through the central outlet. By connecting the particle outlet to an air-tight discharge means gas is prevented from following along with the particle material, at the same time as particles are prevented from following along with the gas through the gas outlet by means of the centrifugal force thereof. In this way substantially 100% separation can be obtained.

A device according to the present invention can be used in such positions where cyclones are normally employed. Examples of fields of application for this apparatus are the cleaning of gas, where the gas device is coupled in an existing steam line. This apparatus can also be used during the manufacture of mechanical pulp in several steps by placing it between the refiners of the first and second step in order to separate steam from the first step, in connection with the feed-in screw to the second step. This apparatus can also be used for separating gas flowing rearwardly through the feed-in screw in a refiner.

BRIEF DESCRIPTION OF THE DRAWINGS

The present invention is described in greater detail in the following detailed description, which, in turn, refers to embodiments illustrated in the accompanying drawings, in which:

FIG. 1 is a side, elevational, sectional view of one embodiment of the apparatus according to the present invention;

FIG. 2 is a front, elevational, sectional view of the apparatus shown in FIG. 1, taken along line II—II thereof.

DETAILED DESCRIPTION

The device according to FIGS. 1 and 2 comprises a housing 1 with a substantially circular cross-section. In the housing a rotor 2 is located on a shaft 3 for rotation in the housing. The rotor 2 is formed with carriers 4, which extend outwardly in the direction towards the peripheral wall of the housing 1, which is preferably rounded in the axial direction. An inlet 5 for a mixture of solid particles and gas, for example defibered fibrous material and steam from a refiner, is located tangentially to the housing 1. An outlet 6 for solid particles is located at the periphery of the housing spaced from the inlet 5. An outlet 7 for gas is located centrally in the housing 1. The particle outlet 6 is connected to an air-tight discharge means 8 for the solid particles, for example a screw feeder 9 for feeding to a subsequent processing step 10 for the particles.

According to FIGS. 1 and 2 the inlet 5 and particle outlet 6 are located substantially diametrically opposed in the housing 1. The angular distance from the inlet 5 to the particle outlet 6 can be increased in order to extend the distance and, thus, the time during which the particle material is affected by the carriers 4. The outlet 6 connected to the screw feeder 9 is at its rear edge, as seen in the rotational direction, provided with a screen 11, which is provided to prevent the particles from being returned into the housing by the carriers of the rotor.

The rotor 2 can preferably be formed as a circular disc 12 where the carriers 4 are located at the periphery of the disc, and where the disc is provided with openings 13 radially inside the carriers, in order to permit gas passage through the disc 12.

In a test installation with a device according to the embodiment shown in FIGS. 1 and 2 a housing with the diameter of 400 mm and a rotor were used, the number of revolutions could be varied between 0 and 3000 r/min. A mixture of fibers and air was supplied with an inlet speed of about 25 m/s through a line with a diameter of 80 mm. The rotor speed was controlled to about 10% over the inlet speed of the material. At a supply capacity of about 3 kg of fibrous material, with 90 percent dry matter content 100% separation of fibers and air was obtained.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. Apparatus for continuously separating a stream of solid particles in a gas comprising a housing having a substantially circular cross-sectional shape and an inner peripheral wall, and including a tangential inlet for said stream of solid particles in a gas, a first outlet for said solid particles and a second outlet for said gas, a rotor rotatably mounted within said housing for rotation therein, said rotor including a plurality of carriers thereabout, said carriers extending outwardly in the direction towards said peripheral wall of said housing in order to affect the supply of said particulate material and said gas, said tangential inlet and said first outlet being disposed on the periphery of said housing spaced from each other in the circumferential direction, and airtight discharge means associated with said first outlet, said second outlet being located centrally in said housing.

2. The apparatus of claim 1 wherein said rotor comprises a circular disk, said plurality of carriers being disposed on the periphery of said circular disk.

3. The apparatus of claim 2 wherein said circular disk includes a plurality of openings disposed radially within said plurality of carriers.

* * * * *